United States Patent

[11] 3,623,975

[72] Inventors Paul J. Cardinal, Jr.;
Robert J. Sherwood, both of Brisbane, Calif.
[21] Appl. No. 807,254
[22] Filed Mar. 14, 1969
[45] Patented Nov. 30, 1971
[73] Assignee Envirotech Systems, Inc.
Brisbane, Calif.

[54] PLURAL PURPOSE SLUDGE INCINERATING AND TREATING APPARATUS AND METHOD
15 Claims, 2 Drawing Figs.

[52] U.S. Cl............................................. 210/6,
110/8, 210/67, 210/152
[51] Int. Cl.......................................... C02c 5/02
[50] Field of Search.......................... 210/6, 10,
18, 45, 47, 152, 66, 67, 252; 110/8, 12, 13

[56] References Cited
UNITED STATES PATENTS
2,015,050  9/1935  Baird et al. .................. 110/13 X
2,072,154  3/1937  Butterfield .................... 210/45
3,279,603  10/1966  Busse ........................... 210/67
3,345,288  10/1967  Sontheimer .................. 210/10
3,440,165  4/1969  Davis et al. ................... 210/45
3,440,166  4/1969  Davis et al. ................... 210/45 X OTHER REFERENCES
Babbitt, H. E., Sewerage and Sewage Treatment, Sixth Edit., 1947, John Wiley & Sons, N. Y., pp. 536 and 537. Relied on (Copy in GP. 176)

Primary Examiner—Michael Rogers
Attorney—Flehr, Hohbach, Test, Albritton & Herbert ABSTRACT: Apparatus and procedure utilizing only a single furnace for incinerating and recalcining sewage sludge and lime sludge obtained from a tertiary raw sewage treating procedure. The carbon dioxide level adjacent the discharge end of the furnace is minimized to obviate recarbonation of the recalcined lime particles discharged from the furnace. The lime particles and ash particles are allowed to form in the furnace in their natural sizes so that they may be separated mechanically. Alternatively, the ash particles and lime particles are slaked together for reuse in the sewage treatment procedure.

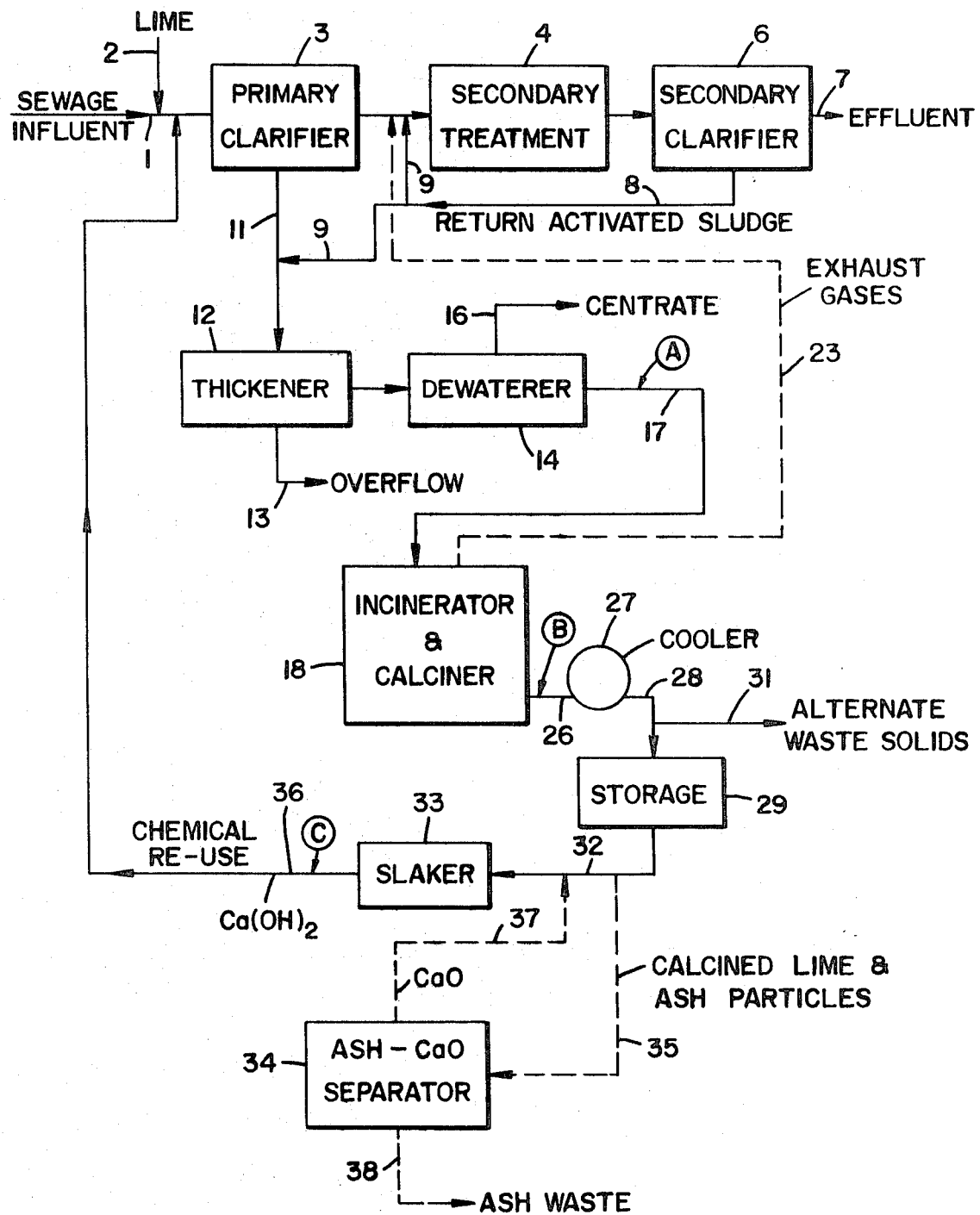
FIG_1

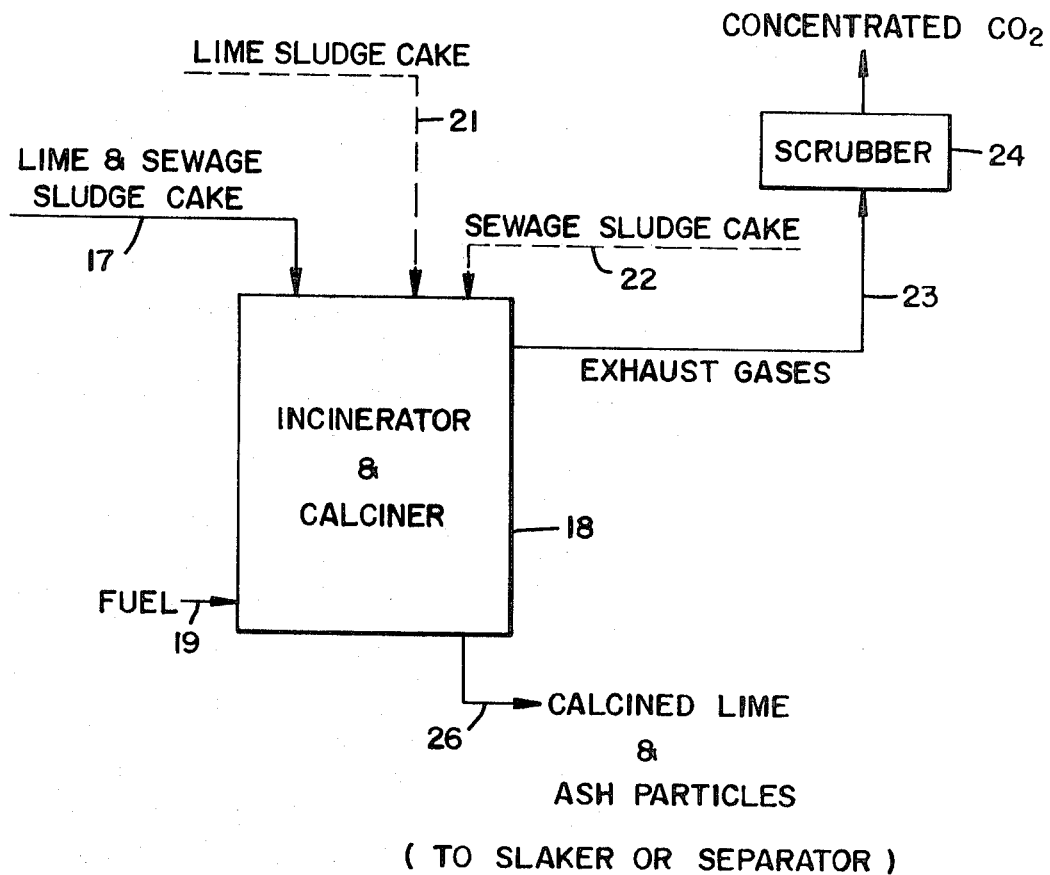
FIG_2

PLURAL PURPOSE SLUDGE INCINERATING AND TREATING APPARATUS AND METHOD

BACKGROUND OF THE INVENTION

1. Field of the Invention

This invention relates to the field of raw sewage treatment. More particularly, this invention relates to the heat treating and recalcination of lime sludge and sewage sludge produced during phosphorous removal by lime precipitation in a tertiary sewage treatment plant. In its more particular aspects, this invention relates to the field of treatment of ash and calcined lime obtained from a recalcining incinerator, and to the separation of the ash and calcined lime in a mechanical separator for selective reintroduction of the lime into the sewage treating procedure. In an alternate embodiment, this invention relates to the field of slaking both ash and recalcined lime particles together for selective reintroduction into and chemical reuse in the raw sewage treating procedure.

2. Description of the Prior Art

Tertiary sewage treating procedures are well known in general terms, as is the recalcining of sewage and line sludge resulting from such a tertiary treating procedure. However, so far as is known, the particular recalcining and treating procedure of this invention, in which the carbon dioxide level adjacent the discharge end of a recalcining furnace is minimized to obviate the possibility of recarbonation of recalcined lime, has not been utilized heretofore. Furthermore, so far as is known, mechanical separation of ash and calcined lime particles which have been permitted to develop to their normal size within the heating device similarly has not been utilized heretofore in the manner described. Additionally, so far as is known, the alternative procedure disclosed herein of introducing both calcined lime particles and ash particles directly into a slaker for treatment therein, and the subsequent introduction of the slaked product back into the raw sewage treating system for chemical reuse therein, has not been utilized heretofore.

While mechanical separation of ash and calcined lime has been disclosed generally heretofore, such as discussed in Albertson U.S. Pat. No. 3,409,545, assigned to Dorr-Oliver Incorporated, such patent and other known commercial operations do not utilize the specific procedural features recited herein.

SUMMARY OF THE INVENTION

This invention relates generally to an improved procedure and apparatus combination for treating line sludge and sewage sludge obtained from a conventional raw sewage treating procedure, such as a tertiary treating procedure. More particularly, this invention relates to the heat treating and recalcining of lime sludge and sewage sludge obtained from a tertiary treating procedure in which gaseous combustion products, such as carbon dioxide, are selectivity maintained at a low level adjacent the discharge end of the heating apparatus to eliminate or obviate the possibility of recarbonation of the recalcined lime produced in and discharged from the heating apparatus. Such selective limitation of the carbon dioxide level is achieved by omitting heat input sources adjacent the discharge end of the heating apparatus.

Still more particularly, this invention relates to a procedure and apparatus for producing calcined lime particles and ash particles of differing sizes and specific gravities so that such particles may be selectively separated from each other, based on their respective sizes or specific gravity, in a mechanical procedure following their discharge from a recalciner. In an alternative embodiment, this invention further relates to a procedure and apparatus for slaking both calcined lime particles and ash particles together and for introducing such combined particles after slaking back into a raw sewage treating procedure for chemical reuse therein.

Preferably, prior to slaking or separation, the calcined lime and ash particles are cooled and, if desired dry stored until needed for subsequent procedural steps in the treating operation.

According to the foregoing, objects of this invention include: the provision of an improved method for heat treating and recalcining lime sludge and sewage sludge obtained for a tertiary treating sewage procedure; the provision of a process and apparatus for controlling recarbonation of recalcined lime particles obtained in a heating device, such as a recalcining furnace; the provision of an incinerating and calcining procedure in which calcined lime particles and ash particles are permitted to develop to their natural sizes in a recalcining furnace to facilitate their subsequent mechanical separation; the provision of an apparatus and process for slaking both calcined lime and ash particles simultaneously, and for reusing such slaked particles chemically in a raw sewage treating procedure; and the provision of a procedure and recalcining furnace for selectively controlling carbon dioxide adjacent the furnace discharge end.

These and other objects of this invention will become apparent from a study of the following disclosure in which reference is directed to the accompanying drawings.

DESCRIPTION OF THE DRAWINGS

FIG. 1 is a schematic view of the lime sludge and sewage sludge treating apparatus and procedure embodied in the present invention, illustrated in conjunction with a raw sewage treating procedure.

FIG. 2 is a schematic view of the incinerating and calcining apparatus and procedure forming part of the subject invention.

DESCRIPTION OF THE PREFERRED EMBODIMENTS

Removing phosphate from raw sewage is a major consideration in sewage treating plants of the tertiary treatment type. Known methods of handling treated sewage wastes heretofore commonly included utilization of two separate heating units, such as furnaces, one for recalcining the lime sludge produced during precipitation of phosphates from the sewage, and the other for incinerating the other waste sewage solids produced during the sewage treatment.

An important feature of this invention resides in the utilization of only a single-heating unit, such as a multiple-hearth furnace, in which lime sludge and sewage sludge are simultaneously heat treated to recalcine the lime sludge and to incinerate the sewage sludge waste to the fullest extent possible. Advantages of such a simplified system are its substantial savings in cost due to the elimination of one furnace from the treating plant, thus reducing substantially the initial capital cost requirements. Additional operating cost savings are realized due to reduced fuel consumption by operating a single furnace to attain the same results previously produced in two separate furnaces.

Furthermore, a higher quality product is obtained in the subject invention by utilizing a modified incinerating and recalcining furnace in which input heating devices are eliminated adjacent the discharge end of the furnace from which recalcined lime particles and ash are discharged. With conventional double furnace arrangements utilized heretofore, the lime recalcining operation was accompanied by parallel flow between the combustion gases, notably carbon dioxide, and the recalcined lime particles being discharged from the furnace. The contact of high level carbon dioxide waste gases with the recalcined lime particles in a conventional procedure frequently resulted in recarbonation of the recalcined lime particles and discharge of a less than satisfactory product from the furnace.

By utilizing a multiple-hearth furnace, and by positioning gas burners or like heat input sources on all but the hearth adjacent the discharge end of the furnace, the carbon dioxide content in the lower discharge zone of the furnace is maintained at a minimum, thereby eliminating or obviating the danger of recarbonation of the recalcined lime and ensuring a higher quality discharge product.

After discharge from the furnace, the combined incinerated ash and recalcined lime particles may be slaked together or, alternatively, mechanically separated so that the calcium oxide may be separately slaked. In either event, the slaked product preferably is reintroduced into the tertiary treating procedure where its chemical value is reutilized.

The recalcined lime from the furnace may be reused either in the primary stage, in a mixer following the secondary treatment, or as a split feed to both the primary and secondary stages, as may be desirable for most effective results in a particular sewage treating plant.

The recalcining furnace can be supplied with a dewatered mixture of lime sludge and sewage sludge from a single dewatering device or, alternatively, lime sludge and sewage sludge may be introduced separately into the furnace from separate dewatering devices.

It has further been found that another important aspect of this invention resides in the combustion of lime sludge and sewage sludge containing calcium carbonate, organic solids, and other volatile and inert solids, in the same furnace to produce sterile particles of nonputrescible particles of ash and recalcined lime. By utilizing an incinerating procedure employing a multiple-hearth furnace in which recalcination and combustion is carried out, it is possible to employ a subsequent mechanical separation for easily separating the recalcined lime particles from the ash particles.

Such separation may be effected by known mechanical devices, such as a screening device or a cyclone centrifuge, which utilizes as its separating concept the different sizes or different specific gravity of the ash particles and recalcined lime particles produced in the furnace. It has been found that by allowing the ash particles and recalcined lime particles to form naturally during incineration and recalcination, by minimizing the abrasion to which such particles are subjected during their formation, the particles will form in differing size ranges rather than in a generally uniform or homogenous size range.

This invention recognizes and utilizes the operational characteristics of a multiple-hearth furnace in which such normal particle size growth is encouraged to result. In many quarters, such characteristics of a multiple-hearth furnace have been considered disadvantageous rather than desirable.

The low abrasive characteristics of a multiple-hearth furnace on particles formed therein is in distinction to other treating procedures, such as cyclonic combustion chambers utilized in coal fired systems, in which the abrasive action of the particles being formed causes such particles to be produced in substantially uniform small physical size. For example, it has been found that in such other procedures substantially uniform particles within the 10 to 50 micron size range commonly result.

In contrast, the incineration and recalcination procedure carried on in a multiple-hearth furnace does not result in formation of particles in homogenous particle size ranges. The multiple-hearth particle sizes vary over substantial ranges, from low micron size particles to particles as much as several inches in diameter. Heretofore, such nonhomogenous particle formation frequently has been considered an indication of poor combustion but it has been found that such nonhomogeneity is a desirable feature in incinerating sludges obtained from chemical treatment of raw sewage.

Because of the tendency of incinerated sludge in a multiple-hearth furnace to grow to its own natural constituent particle size range, physical separation of calcined particles from ash particles after multiple hearth burning is simplified and conventional mechanical or physical means may be utilized. The compounds formed during incineration, such as calcium oxide, and other compounds such as iron oxide, aluminum oxide and silicon oxide, all have natural size and specific gravities characteristics peculiar to their own natural physical and chemical structure. When these materials are allowed to combust in a system which does not physically abrade them to homogenous sizes with other particles of different constituency, it has been found that such particles achieve a close resemblance to their natural size ranges. Thus, utilization of both the specific gravity and size of particles, such as calcium oxide particles, may be utilized to facilitate mechanical separation thereof from other particles such as waste ash.

Referring to FIG. 1 the improved treating process and apparatus combination utilized in this invention are shown in conjunction with a standard raw sewage tertiary treating procedure in which raw sewage influent is introduced, through conduit 1, along with lime passing through conduit 2, into a primary clarifier 3. After clarification, the clarified mixture is subjected to a secondary treatment, such as aeration, in secondary treating tank 4, following which secondary clarification in a secondary clarifier 6 normally is effected. The treated effluent passes from the system through conduit 7, for subsequent disposal or valuable reuse, while activated sludge is selectively reintroduced from the secondary clarifier into the system in known fashion through conduits 8 and 9 as illustrated.

The sewage discharge mixture from the primary clarifier 3, which includes lime sludge and sewage sludge in a fluid carrier, is introduced through conduit 11 into a thickener 12, the fluid overflow from which passes through conduit 13 for disposal. The thickened lime sludge and sewage sludge are then preferably introduced into a dewaterer 14, for further concentration therein. Such dewaterer may take any known form, such as a centrifuge, vacuum filter, or filter press, of readily available type. In the described embodiment, a centrifuge dewaterer is utilized and the liquid centrate separated therein from the solids is discharged through a conduit 16 for disposal.

As thus far described, the system constitutes a generally standard raw sewage tertiary treating procedure of the type known in the art heretofore.

The dewatered lime sludge and sewage sludge, in dewatered cake form, are then introduced through conduit 17 into a heating device 18 in which recalcination of the lime sludge and incineration of the sewage sludge are to be effected. The heat treating device preferably is a multiple-hearth furnace modified as described hereinafter to produce the improved results characteristic of this invention.

FIG. 2 illustrates an alternate arrangement in which the lime sludge cake may be separately introduced into the furnace through a conduit 21 while the sewage sludge cake may be separately introduced into the furnace through conduit 22. In such arrangement, the lime sludge and sewage sludge are separately dewatered in suitable devices. The sludge infeed arrangement chosen will be selected depending upon particular plant requirements.

Fuel is introduced into furnace 18 through a suitable fuel source, designated 19, for burning therein in known fashion. Preferably such fuel is gas to feed the conventional gas burners spaced throughout the furnace as described hereinafter.

The exhaust gases resulting from incineration of the sludge in furnace 18 are discharged through conduit 23 from the top of the furnace and preferably are passed through a scrubber 24 of any known construction to cleanse the carbon dioxide produced during combustion for subsequent reuse thereof. As noted from FIG. 1, such exhaust gases, particularly the concentrated carbon dioxide, may be selectively reintroduced into the tertiary treating system through an extension of conduit 23 for utilization in the treating procedure for the purposes described hereinafter.

Preferably the multiple-hearth furnace is gas fired and includes burners selectively positioned along its length adjacent all hearths of the furnace except the hearth which is most closely adjacent the lower discharge end of the furnace. By eliminating the burner adjacent the furnace discharge end, it has been found that continued combustion is not encouraged at such discharge end so that the carbon dioxide level in the lower discharge zone of the furnace is minimized to ensure a higher quality product being produced in the furnace. That is, prior to its discharge from the furnace, the calcined lime produced is less subject to recarbonation because it is generally out of contact with carbon dioxide and other gases of combustion produced in the furnace. In conventional lime calcining operations, the gases of combustion and recalcined product flow parallel to and in contact with each other so that the recalcined product is carried in a high carbon dioxide gas stream which tends to recarbonate the product.

With a specially designed furnace of this invention, such parallel flow between the carbon dioxide exhaust gases and recalcined lime is minimized and the possibility of recarbonation noted above is obviated.

As noted previously, a further important advantage obtained from utilization of a multiple-hearth furnace results from the ability of such furnace to produce naturally sized particles of calcined lime and ash which may more readily be separated physically. That is, the minimization of abrasive action on the particles produced, which is characteristic of cyclone combustion chambers and the like, permits natural particle size growth, thereby simplifying physical separation subsequent to discharge from furnace 18.

The principal products of the furnace, namely reclacined lime and ash particles, are discharged from the furnace through conduit 26, desirably into a cooler 27 in which the temperature thereof is reduced to facilitate subsequent handling thereof. Preferably, a substantially dust free cooling procedure is utilized and for that purpose cooler 27 preferably is of the type referred to as a rotating hollow disc cooler (THERMAL DISC cooler of the type produced by BSP Corporation) which treats powdery materials within an enclosed system to eliminate dust handling and safety problems while effecting efficient cooling. Such a cooler is illustrated and described in Stevens U.S. Pat. No. 3,391,733 dated July 9, 1968. Such a rotating disc cooler utilizes water as a heat transfer medium and effectively decreases the temperature of the recalcined particles and ash particles from the high temperature at which they exit from the furnace to less then 400° F. From the cooler, the particulate product passes through conduit 28 into a dry storage bin 29 for subsequent treatment or, alternatively, through conduit 31 to an alternate waste solids disposal area.

From storage bin 29, the recalcined lime and ash particles are withdrawn as required and pass through conduit 32 for subsequent introduction and treatment in a slaker 33. Alternatively, the recalcined lime and ash particles may be introduced through conduit 35 for handling in a separator 34. The first-mentioned alternative treating procedure, namely of slaking both the ash and the calcium oxide in the calcined lime together, is a novel feature of the subject treating procedure when such slaked product is reintroduced through conduit 36 back into the tertiary treating procedure, as noted from FIG. 1, for chemical reuse therein. In known fashion, in the slaker the ash and lime particles are water treated to convert calcium oxide to calcium hydroxide suitable for reuse in the sewage treatment.

The other alternative treating procedure shown in FIG. 1 employs selectively introducing calcined lime and ash particles into separator 34 for physical separation from each other. Following such separation the separated calcium oxide is reintroduced into the system through conduit 37 in advance of the slaker for conversion therein to calcium hydroxide and subsequent reuse in the tertiary treatment procedure. The separated ash particles in turn are discharged through conduit 38 for suitable ash waste disposal.

The ash-calcined lime separator selected may be of several available types which operate on mechanical principles of separating particles based on their varying sizes or specific gravities or the like. As noted previously, the ash and calcined lime particles are allowed to achieve their normal growth in the multiple-hearth furnace so that physical separation thereof is simplified. In its preferred aspects, the separator is of the cyclone centrifuge type or the mechanical screen type in which particle specific gravity and size of the respective products are utilized to effect their separation from each other. Both types of equipment, namely centrifugal separation equipment and physical screening separation equipment, are available on the market from companies such as Buell Engineering Company or Bauer Brothers Company.

By way of specific examples, the plural purpose sludge burning procedure described is set out with reference to particular furnace sludge charges in the following two tabular examples. The sludge constituencies in examples 1 and 2 are set out for reference points A, B and C appearing in FIG. 1, with reference point A being in advance of furnace 18, reference point B being adjacent the discharge end of the furnace 18, and reference point C being downstream from slaker 33.

DUAL LIME AND SEWAGE SLUDGE INCINERATING AND RECALCINING—EXAMPLES 1 AND 2

| Item (lbs.): | $A_1$ | $A_2$ | $B_1$ | $B_2$ | $C_1$ | $C_2$ |
|---|---|---|---|---|---|---|
| Volatile solids | 1,250 | 1,250 | 0 | 0 | 0 | 0 |
| Inert solids | 510 | 510 | 510 | 510 | 510 | 510 |
| $CaCO_3$ | 1,250 | 2,500 | 0 | 0 | 0 | 0 |
| $Ca_5OH(PO_4)_3$ | 275 | 550 | 0 | 0 | 0 | 0 |
| $Ca(OH)_2$ | 0 | 0 | 0 | 0 | 950 | 1,860 |
| $CaO$ | 0 | 0 | 715 | 1,430 | 0 | 0 |
| $Ca_3(PO_4)_2$ | 0 | 0 | 250 | 500 | 250 | 500 |
| Totals (lbs.) | 3,285 | 4,810 | 1,475 | 2,440 | 1,710 | 2,870 |
| Percent CaO | 0 | 0 | 49 | 59 | 0 | 0 |

During operation of the treating system under a relationship such as illustrated in example 2, the additional lime added to the primary clarifier of the tertiary treating procedure results in a pH therein of greater than 10. Such additional lime produces no change in the incineration and recalcining procedure described. To counteract the high pH the exhaust gases from the furnace are reintroduced into the tertiary treating procedure in advance of the secondary treatment as noted in FIG. 1. Without such a $CO_2$ reintroduction step, the bacteria in the secondary treatment operation would be inhibited by exposure to too high a pH and the reintroduction of $CO_2$ into the system lowers the pH to a workable level.

By way of further specific example, it has been found that in a multiple-hearth furnace of conventional six-hearth construction, temperature ranges preferably are modified from those utilized heretofore in sludge burning. The following table sets out temperature ranges in a conventionally utilized furnace and in the improved modified furnace of this invention. It will be noted that higher incineration and recalcining temperatures are employed in the intermediate zone of the furnace and the discharge temperatures are accordingly higher, due to the slower cooling from the more elevated incineration temperatures utilized in the intermediate furnace zone. However, the higher discharge temperatures are not accompanied by high level carbon dioxide for the reasons advanced previously.

| Hearth No. | Conventional | | Temperatures (°F.) Improved | |
|---|---|---|---|---|
| | Range | Preferred | Range | Preferred |
| 1 | 700–900 | 800 | Approx. 900–1,100 | Approx. 1,000 |
| 2 | 900–1,000 | 950 | Approx. 1,200–1,500 | Approx. 1,300 |
| 3 | 1,100–1,300 | 1,200 | Apprx. 1,500–1,700 | Approx. 1,600 |
| 4 | 1,400–1,600 | 1,500 | Approx. 1,650–1,900 | Approx. 1,850 |
| 5 | 1,100–1,500 | 1,300 | Approx. 1,650–1,900 | Approx. 1,850 |
| 6 | 600–1,000 | 800 | Approx. 800–1,100 | Approx. 1,000 |

Having thus made a full disclosure of this invention, reference is directed to the appended claims for the scope of protection to be afforded thereto.

We claim:

1. A method of heat treating in a single furnace lime sludge and sewage sludge obtained from a raw sewage tertiary treating procedure or the like, comprising
   A. introducing said lime sludge and sewage sludge into a furnace and moving the same therethrough at a predetermined rate,
   B. incinerating said sludge in a first zone of said furnace and recalcining said sludge in another zone of said furnace by thermally decomposing said sludge as the same moves therethrough,
   C. while said sludge is moving through said furnace, controlling the abrasive contacts to which said sludge is subjected in said furnace so that generally discrete calcined lime particles and ash particles are permitted to form naturally to their normally different sizes to facilitate subsequent mechanical separation thereof, and
   D. controlling the formation of and flow of the gases of combustion such as carbon dioxide in said furnace by eliminating input heat sources adjacent the discharge end of said furnace so that such gases are maintained at a low level adjacent such discharge end of said furnace from which said ash and recalcined lime particles are discharged to obviate recarbonation of such recalcined lime particles emanating from said furnace.
2. The method of claim 1 in which said first incinerating zone of said furnace is maintained at a temperature not exceeding approximately 1,650° F. and in which said other calcining zone of said furnace is maintained at a temperature of approximately 1,850° F.
3. The method of claim 1 which further includes
   E. dewatering said lime sludge and sewage sludge prior to introducing the same into said furnace.
4. The method of claim 1 which further includes
   E. slaking said recalcined lime and ash particles to prepare said recalcined lime particles for subsequent recycling and reuse in said raw sewage treating procedure.
5. The method of claim 1 in which said recalcined lime and ash particles are mechanically separated following discharge from said furnace by utilizing their different particle sizes to effect such separation.
6. The method of claim 1 which further includes
   E. treating said ash and recalcined lime particles discharged from said furnace to physically separate the same from each other so that said lime particles may be selectively reused in treating raw sewage.
7. The method of claim 6 in which said slaked lime particles are reintroduced directly into said raw sewage tertiary treating procedure.
8. The method of claim 4 in which said separation of said ash and recalcined lime particles is effected physically by mechanically removing said ash particles from said lime particles based on and by utilizing the different sizes of such particles following discharge of the same from said furnace.
9. The method of claim 1 in which said incineration and recalcination are effected in a multiple-hearth furnace.
10. The method of claim 9 in which the temperatures in said furnace are regulated to divide said furnace into three predetermined operative sludge treating zones in which the temperatures are maintained within preferred ranges as follows:

Entrance zone       approximately 900°–1,100° F.
    Intermediate zone    approximately 1,500°–1,900° F.
    Discharge zone      approximately 800°–1,100° F.

11. Apparatus for treating sewage sludge and lime sludge in a raw sewage treating procedure to incinerate and recalcine the same comprising, in combination,
    A. a single furnace having input heat sources therein except adjacent the end thereof from which ash and recalcined lime particles are discharged,
        1. means in said furnace for moving said sludge toward said discharge end thereof without appreciably altering the natural particle size of the ash and recalcined lime formed in said furnace so that generally discrete calcined lime particles and ash particles may form naturally within said furnace to their normal different sizes, and
    B. a mechanical separator into which said particles of ash and recalcined lime are selectively introduced following incineration and calcining thereof in which said particles are separated from each other on the basis of their different sizes.
12. The apparatus of claim 11 which further includes
    C. a dewatering device for removing excess liquid from said sewage sludge and lime sludge prior to introduction thereof into said furnace.
13. The apparatus of claim 11 which further includes
    C. a slaker into which said ash and recalcined lime particles are introducible for slaking and subsequent reuse of said lime particles in said sewage treating procedure.
14. The apparatus of claim 11 in which said furnace is of the multiple hearth type having fuel burners along each of its hearths except the hearth adjacent said discharge end, whereby combustion and the carbon dioxide level adjacent said discharge end are minimized to obviate recarbonation of the recalcined lime discharged from said furnace.
15. The apparatus of claim 14 in which said furnace is operatively divided into at least two distinct zones for incinerating and recalcining said sludge in which the temperatures are maintained at a level not exceeding approximately 1,650° F. in a first incinerating zone and maintained at approximately 1,850° F. in the second calcining zone.

* * * * *